UNITED STATES PATENT OFFICE.

IRA D. ODLE, OF GAINESVILLE, FLORIDA.

MEDICATED FOOD PRODUCT.

1,120,330. Specification of Letters Patent. Patented Dec. 8, 1914.

No Drawing. Application filed June 18, 1914. Serial No. 845,793.

*To all whom it may concern:*

Be it known that I, IRA D. ODLE, citizen of the United States, residing at Gainesville, in the county of Alachua and State of Florida, have invented certain new and useful Improvements in Medicated Food Products; and I do hereby declare the following to be a full, clear, and exact description of the invention, such as will enable others skilled in the art to which it appertains to make and use the same.

My invention relates to medicated food products or palatable therapeutical preparations, its prime object being to provide a palatable and readily stored medium for introducing bacteria into the human system.

It has long been known that certain bacilli when introduced through the stomach will propagate within the digestive organs of the body and will act as germicides for destroying the toxins tending to produce digestive disorders. Such a therapeutic action has been particularly noted in connection with lactic acid bacilli, such as the *Bacillus Bulgaricus* studied by Professor Metchnikoff, which readily propagates in the alimentary tracts and acts as an effective germicide for preventing auto-intoxication and the like. Such bacilli have heretofore been introduced into the system as constituents of liquids of the order of butter-milk, the preparation of which liquids required conditions not always available, and which liquids could be kept only for very limited periods of time. Moreover, the liquids thus prepared are not palatable to those who have no fondness for the taste of butter-milk and will not permit of being flavored to suit various tastes.

The prime objects of my invention are to provide a food product which will act as a carrier for introducing such bacilli into the digestive tracts of the body, which may easily be stored and kept for a considerable length of time, and which may be varied in flavoring so as to make it palatable to persons of widely varying tastes. I accomplish these objects primarily by mixing a suitably concentrated culture of the desired bacilli with cream and freezing the mixture after the customary manner to make ice cream, which ice cream may be suitably flavored either before or after the freezing process.

In carrying out my invention, I preferably start with a pure culture which may be obtained on the market in liquid form, or with bacillary tablets as also obtainable on the market. This initial culture is grown in one quart of sterile skimmed (or practically fat free) milk at a temperature of approximately 37° C., the incubating being continued until an acid value of 3.8 to 4 per cent. is reached. The liquid is then mixed with at least as large a quantity of sterile, fat free milk, after which it is incubated again until it shows an acid value between 2.8 and 3, the acidity being readily determined by titrating a sample of the liquid with sodium hydroxid, preferably using a $\frac{1}{10}$ normal solution. When the culture liquid has reached this desired degree of acidity, it is cooled to a temperature of from 5 to 0 degrees C., at which temperature the liquid may be kept as a stock culture. However, if this stock solution is kept for some time, it should be tested frequently as a check on the gradual decrease of its bacterial content, which latter can be restored to its proper value by adding sterile and substantially fat free milk and again incubating. I preferably use five gallon tanks for the storage for the stock solution, as I have found them more satisfactory than tanks of larger size. The tank used should preferably be equipped with means for stirring the liquid to effect a uniform distribution of the bacteria and it should have a faucet at the bottom for enabling the liquid to be drawn off as needed. The stirring may be effected by supporting the entire tank in such a manner that it may be swung or churned back and forth. As the final step in preparing my medicated food product, I add the stock culture (prepared as above) to pasteurized cream, and thereupon freeze the cream after the usual manner to produce ice cream. The proportions of the pasteurized cream and the standard stock culture may be varied according to the bacterial content desired in the resulting product; that is to say, one volume of the stock culture may be added to from 1 to 20 volumes of the cream. If the proportion of stock culture to the cream is relatively large, some of the flavors commonly used with ice cream (any of which flavors may be added before the cream admixed with the stock culture is frozen) may not eliminate the acid taste. In this case, I preferably add a small amount of lime to neutralize the acid, although I have found that this usually will not be necessary when the acidity of the mixture of cream and stock culture does not exceed 2.

When the culture-laden ice cream has been prepared as above, the bacteria in the same are practically dormant and will decrease in number very slowly. Consequently, the medicated food product of my invention may be stored for a considerable period of time without appreciably losing its therapeutic value. However, as soon as the ice cream is eaten and melted by the warmth of the body, the bacilli contained therein will propagate rapidly and particularly so as the cream forms an excellent medium for their growth. It will be evident that by varying the flavor used in the manufacture of the ice cream, or by adding suitable flavoring matter to the ice cream when it is being served, the taste can be varied so as to make my food product palatable to practically everyone. It will also be evident that other bacteria besides the Bulgarian lactic acid bacilli above mentioned may be used and that the preparation may be varied in numerous details without departing from the spirit of my invention. For example, the incubating of the original culture may be done at a somewhat higher temperature, although I prefer not to have this temperature exceed 40° C. It will also be evident that if any putrefactive bacteria should be present in the cream to which the stock culture is added, the lactic acid formed during the incubation of the stock culture will act as a germicide to prevent their development. Consequently, there will be no danger of the propagation of such bacteria as streptococci, which grow better at low temperatures than at a high temperature and which must, therefore, be checked by a germicide, the effect of which latter will not be detrimental when taken into the body. Consequently, my invention simultaneously provides a check for impurities in the cream (although the latter is preferably pasteurized before being mixed with the stock culture) and also provides a germicide which will readily become active within the digestive tracts of a person eating this palatable food product.

While I have described my food product as comprising a culture-laden ice cream, it will be evident that other frozen confections (such as sherbets or water-ices) may be similarly medicated by mixing a culture of bacteria with the ingredients thereof before freezing the latter. However, I preferably use my invention in connection with ice-cream as the cream after being eaten affords a better medium for the propagation of the bacteria within the digestive system.

I claim as my invention:

1. The medicated food product comprising a frozen confection containing a culture of lactic acid bacilli, the said culture being mixed with the ingredients of the confection before the freezing of the latter.

2. The medicated food product comprising a frozen confection containing a culture of bacteria and a sufficient quantity of lime for approximately neutralizing the acidity of said culture, the said culture and lime being mixed with the ingredients of the confection before the freezing of the latter.

3. The medicated food product comprising ice cream made by freezing cream admixed with a culture of lactic acid bacilli.

4. The medicated food product comprising ice cream made by freezing cream admixed with a culture of lactic acid bacilli, and with a sufficient quantity of lime for neutralizing the acidity of the said culture.

5. The medicated food product comprising ice cream containing a dormant culture of lactic acid bacilli capable of being propagated in the cream to which the said ice cream is molten by the body warmth of the eater of the ice cream.

6. The medicated food product made by incubating bacteria in substantially fat free milk to an acidity not exceeding about four per cent., mixing the resulting culture with additional fat free milk, incubating the mixture, stirring the said mixture into at least as large a volume of cream, and thereafter freezing the resulting mixture.

7. The medicated food product made by incubating lactic acid bacilli in a gradually increased quantity of substantially fat free milk, mixing the resulting culture with cream, and thereafter freezing the said mixture.

In testimony whereof I have signed my name in presence of two subscribing witnesses.

IRA D. ODLE.

Witnesses:
R. R. SELLERS,
C. A. MARTINI.